(12) United States Patent
Yu et al.

(10) Patent No.: US 6,404,379 B1
(45) Date of Patent: Jun. 11, 2002

(54) MATRIX MONOPULSE RATIO RADAR PROCESSOR FOR TWO TARGET AZIMUTH AND ELEVATION ANGLE DETERMINATION

(75) Inventors: Kai-Bor Yu, Niskayuna; Yibin Zheng, Rexford, both of NY (US)

(73) Assignee: Lockheed Martin Corporation, Bethesda, MD (US)

( * ) Notice: Subject to any disclaimer, the term of this patent is extended or adjusted under 35 U.S.C. 154(b) by 10 days.

(21) Appl. No.: 09/607,004

(22) Filed: Jun. 29, 2000

(51) Int. Cl.[7] .............................................. G01S 13/44
(52) U.S. Cl. ...................... 342/80; 342/147; 342/148; 342/149; 342/152; 342/194; 342/195
(58) Field of Search ........................ 342/80, 147, 148, 342/149, 152, 194, 195

(56) References Cited

U.S. PATENT DOCUMENTS

| | | | | |
|---|---|---|---|---|
| 4,672,378 A | * | 6/1987 | Drabowitch et al. | 342/17 |
| 5,302,961 A | * | 4/1994 | Murrow et al. | 342/427 |
| 6,087,974 A | * | 7/2000 | Yu | 342/62 |
| 6,195,035 B1 | * | 2/2001 | Wood | 342/80 |
| 6,316,934 B1 | * | 11/2001 | Amorai-Moriya et al. | 324/207.17 |

FOREIGN PATENT DOCUMENTS

| | | | | |
|---|---|---|---|---|
| DE | | 3630482 A | * 5/1988 | H01P/1/38 |

OTHER PUBLICATIONS

P.Z. Peebles, R.s. Berkowitz, "Multiple Target Monopulse Processing Techniques", IEEE Transactions on Aerospace and Electronic Systems, vol. AES–4, No. 6, Nov. 1968.

S.M. Sherman, "Complex indicated Angles Applied to Unresolved Radar Targets a Multipath". IEEE Transactions on Aerospace and Electronic systems, vol. AES–7, No. 1, Jan. 1971.

R.O. Schmidt, "Multiple Emitter Location and Signal Parameter Estimation," IEEE Trans. Antennas Propagation, vol. AP–34, pp. 276–280, 1986.

D.W. Tuffs and R. Kumaresan, "Estimation of Frequencies of Multiple Sinusoids: Making Linear Predictions Like Mazimum Likelihood," Proc. IEEE vol. 70, pp. 975–989, 1982.

G.F. Halke and K.W. Forsythe, "A Class of Polynomial Rooting Algorithms for Joint Azimuth/Elevation Using Multidimensional arrays", in 28th Asilomar Conference on Ssignals, Systems and Computers, Pacific Grove, CA 1994.

R. Roy and T. Kailath, "ESPRIT—Estimation of Signal paameters Via Rotational Invariant Techniques", IEEE Transaction on Acoustics, Speech, Signal processing, vol. 37, pp. 984–995, Jul. 1989.

* cited by examiner

Primary Examiner—John B. Sotomayor
(74) Attorney, Agent, or Firm—Scully, Scott, Murphy & Presser

(57) ABSTRACT

A method and system for identifying the locations of plural targets lying within a main beam of a monopulse antenna including four ports for generating sum, elevation difference, azimuth difference and double difference signals. The method comprises the steps of forming a monopulse ratio matrix from the sum, elevation difference, azimuth difference and double difference signals; and determining eigenvalues of the monopulse ratio matrix. These eigenvalues are then used to determine the angular locations of the plural targets. Preferably, the eigenvalues are determined by performing an eigenvalue decomposition of the monopulse ratio matrix to generate eigenvalues, and the angles of the targets may be determined from the eigenvalues by the use of a look-up table.

13 Claims, 6 Drawing Sheets

US 6,404,379 B1

MATRIX MONOPULSE RATIO RADAR PROCESSOR FOR TWO TARGET AZIMUTH AND ELEVATION ANGLE DETERMINATION

FIELD OF THE INVENTION

This invention relates to arrangements, systems or receivers using monopulse techniques, such as those receivers used for radar surveillance or for radio frequency (RF) missile seekers, and more particularly to improved arrangements for locating targets, including up to two targets within the main beam of the antenna.

BACKGROUND OF THE INVENTION

A monopulse antenna system includes plural antenna elements which receive the signal whose location is to be identified, and also includes various couplers which add the signals from various combinations of the antenna elements for generating sum signals, and azimuth and elevation difference signals. One type of prior-art monopulse antenna has four feed horns at the focus of a reflector, and a monopulse array antenna may have many antenna elements, beamformed to generate the desired sum and difference signals. In the context of such antennas, the term "azimuth" and "elevation" are conventionally used, but refer to two mutually orthogonal measurements rather than to actual orientations.

In a monopulse antenna system, the presence of the target is determined by the existence of a signal within the sum beam. In the presence of a target as determined from the sum beam, the elevation difference signal is divided by the sum signal to generate a value which establishes the elevation angle, and the azimuth difference signal is divided by the sum signal which determines the azimuth angle. The quotients of the divisions are applied to look-up tables in order to determine the corresponding angular location within an antenna beam.

The beamwidth of an antenna is inversely related to the dimensions of an antenna measured in wavelengths; as the antenna gets smaller relative to the wavelength, the beamwidth gets larger. Some systems, like radar systems or RF missile seeking systems, detect and track their targets by use of the mainlobe of an antenna. In general, mobile devices must use small antennas, even when operated at the highest practical frequency, and the antenna thus tends to have a wide main beam, which imposes limits on the ability of a system to identify closely spaced sources, which in the case of a missile might cause the missile to home on a decoy located near the actual target, or to home on ground reflections.

In the context of a ground-based search radar system, the time required to complete the volume scanning requires that the antenna beam be relatively broad or large. Moreover, advanced search radar favors low frequency operation for low radar cross section (RCS) target detection advantage. Thus, the antenna beam of the scanning radar antenna, being broad, is likely to contain a plurality of targets. The look-up tables of a monopulse antenna system cannot provide angles in the presence of multiple targets within the main beam of the antenna. Improved monopulse target or source location is desired.

For instance, advanced air defense missile seekers have been developed. The requirement is that the seeker has capability to track incoming tactical ballistic missile (TBM), cruise missile and fighters and to home on these targets. However, angle deception techniques such as towed decoy and ground bounce jamming have emerged as real threats for denying missile tracking and target homing. Also, ground based radar have been designed which are susceptible to have multiple targets within the main beam. In addition, advanced synthetic aperture radar (SAR) systems have been developed which face adverse electronics-counter-measure (ECM) threats including mainbeam deceptive jammers. Next generation shipboard fire-control radar, which need to operate in adverse mainlobe jamming environment have been developed.

Prior work for multiple target angle estimation within the mainbeam include extension of monopulse technique and modern subspace eigenstructure analysis. Monopulse processing techniques for multiple targets are discussed in "Multiple Target Monopulse Processing Techniques," by Peebles and Berkowitz, IEEE Transactions on Aerospace and Electronic Systems, Vol. AES-4, No. 6, November 1968. However, the technique disclosed therein requires special antenna configurations that are much more complicated than the sum-difference channels normally used in monopulse radars. Moreover, the proposed technique generally requires six beams to resolve two targets. The article "Complex Indicated Angles Applied to Unresolved Radar Targets and Multipath," by Sherman, IEEE Transactions on Aerospace and Electronic Systems, Vol. AES-7, No. 1, January 1971, concludes that with a conventional monopulse configuration, a single pulse solution is impossible. This reference discloses a method to resolve two targets using two independent measurements, but it is not a "monopulse" technique per se.

Modern high-resolution signal subspace algorithms such as MUSIC, root-MUSIC, minimum-norm algorithms and others overcome the beamwidth limitation by exploiting measurements over multiple channels with a multiple number of snapshots. Essentially, these algorithms make use of the eigenstructure of the covariance matrix of sensor outputs to estimate the number of signal sources and the direction-of-arrival (DOA) of the sources. These techniques exhibit a high-resolution capability in that they offer a practical means of separating them in less than the Rayleigh resolution limit determined by the antenna aperture size. However, conventional super-resolution algorithms such as MUSIC are computational intensive as it requires two-dimensional manifold search. Moreover, these methods require multiple snapshots for covariance matrix estimation.

Several references disclose recently developed super-resolution techniques for resolving multiple sources impinging planar antenna array based on two-dimensional root-finding method such as PRIME-MUSIC and invariance principle such as ESPRIT. These references include: U.S. patent application Ser. No. 09/128,282 for "Monopulse System For Target Location" by K. B. Yu; "Structured null space problem," SPIE conference on Advanced Signal Processing Algorithms, Architectures, and Implementations VIII, Jul. 22–24, 1998, San Diego, Calif. Vol. 3461, pp. 280–285, by F. T. Luk and K. B. Yu; "A Class of Polynomial Rooting Algorithms for Joint Azimuth/Elevation Estimation Using Multidimensional Arrays," in $28^{th}$ Asilomar Conference on Signals, Systems and Computers, Pacific Grove, Calif. 1994, by G. F. Hatke and K. W. Forsythe; and "ESPRIT—Estimation of Signal Parameters Via Rotational Invariant Techniques," IEEE Transactions of Acoustics, Speech, Signed Processing, Vol. 37, pp. 984–995, July 1989, by R. Roy and T. Kailath. These techniques make use of multiple snapshots for covariance matrix accumulation and may suffer from the target fluctuations between pulses. Also, there may not be time for multiple measurements especially when pulse compression is used to generate fine rangedoppler profile. A single snapshot technique based on four monopulse channels is disclosed in copending patent application Ser. No. 09/607146 for "Monopulse Radar Processor For Resolving Two Sources," filed Jun. 29, 2000 by Y. Zheng and K. B. Yu. This technique is based on measurement modeling and the algorithm involves a quadratic equation followed by a linear equation.

SUMMARY OF THE INVENTION

An object of this invention is to provide a method and system for identifying the location or angular direction of a single target within the main beam of a monopulse antenna.

Another object of the present invention is to use a matrix monopulse ratio processing technique to identify the location or angular direction of a single target within the main beam of a monopulse antenna.

These and other objectives are attained with a method and system for identifying the locations of plural targets lying within a main beam of a monopulse antenna including four ports for generating sum, elevation difference, azimuth difference and double difference signals. The method comprises the step of forming a monopulse ratio matrix from the sum, elevation difference, azimuth difference and double difference signals. Eigenvalues of the monopulse ratio matrix are determined, and values of the eigenvalues are used to determine the angular locations of the plural targets. Preferably, the eigenvectors are determined by performing an eigenvalue decomposition of the complex monopulse ratio matrix to generate complex eigenvalues and the azimuth and elevation angle of the target can be determined from the real and imaginary part of the eigenvalue by the use of a look-up table.

Further benefits and advantages of the invention will become apparent from a consideration of the following detailed description, given with reference to the accompanying drawings, which specify and show preferred embodiments of the invention.

DETAILED DESCRIPTION OF THE PREFERRED EMBODIMENTS

Figure 1:
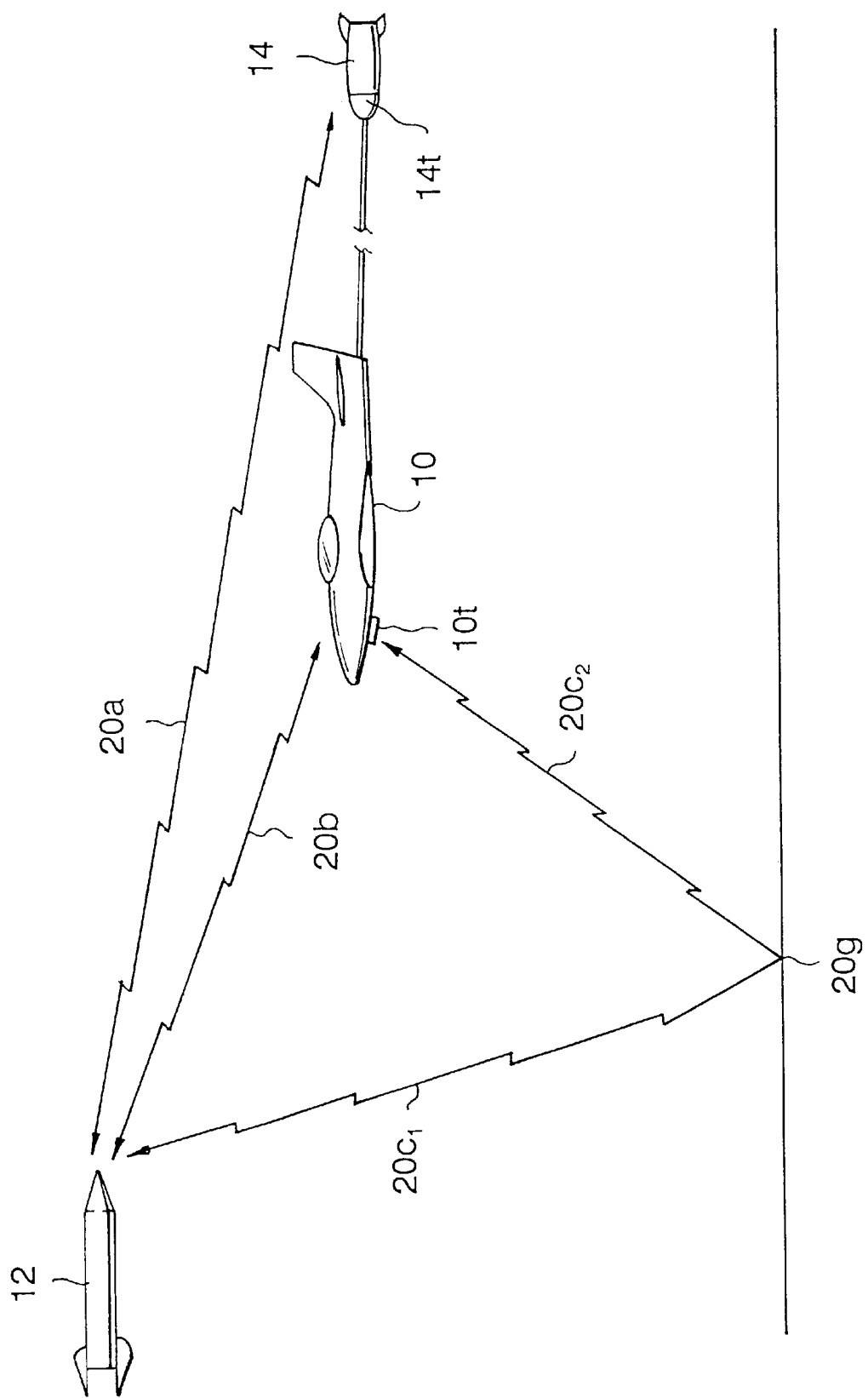
FIG. 1 is a simplified representation of a missile attacking a target aircraft which is using a repeater and towing a decoy.

In FIG. 1, an aircraft 10 is represented as being attacked by a missile 12. Missile 12 determines the location of the target aircraft 10 by use of radar using monopulse techniques. The target aircraft 10 defends itself by two different methods, namely by use of a decoy 14, and by use of a ground-pointing transponder 10t. Various radar signals are generated and irradiated and out via the missile 12, which are represented by "lighting bolt" symbols forming antenna beams 20a, 20b, and 20$c_1$. Antenna beams 20a, 20b, and 20$c_1$ may be generated either simultaneously or sequentially. Antenna beam 20a is directed toward the decoy 14, beam 20b is directed toward the aircraft, and beam 20$c_1$ is directed toward the ground at a location 20g.

Since the decoy 14 is smaller than the aircraft, its radar signature or reflection as perceived by the missile on beam 20a would ordinarily be smaller than that of the aircraft as perceived on beam 20b. In an attempt to make the decoy appear, to the missile 12, to be larger than the aircraft, the decoy includes a transponder 14t, which receives the transmitted radar signals arriving over antenna beam 20a or 20b communicated through a cable between aircraft 10 and decoy 14, and amplifies and retransmits the signals. The amplified and retransmitted signals retrace their paths over beam 20a, and arrive back at the missile with greater amplitude than the signals transmitted over antenna beam 20b and reflected by aircraft 10.

The aircraft 10 of FIG. 1 may operate its ground-directed transponder 10t in such a manner as to retransmit those signals transmitted by missile 12 over antenna beam 20$c_1$, reflected from that portion of the earth's surface lying near location 20g, and arriving at the aircraft 10 by way of path 20$c_2$. At least some of the energy retransmitted by transponder 10t flows along path 20$c_2$, is reflected from location 20g, and flows back along path 20$c_1$ to the missile. The transponder 10t may be used instead of the decoy 14, or in conjunction with the decoy 14, or the decoy 14 may be used alone. Regardless of which defense technique is used by aircraft 10, the missile receives strong signals from directions which are not the direction of the target aircraft, and may not be able to identify correctly the direction of the aircraft relative to the missile.

The problem of identification of the proper target is exacerbated when the main beam or main lobe of the antenna is relatively wide, because the main beam of the radar of missile 12 may subtend both the aircraft 10 and the decoy 14, or both the aircraft 10 and the ground reflection region 20g. This state of affairs is equivalent to beams 20a and 20b of FIG. 1, or beams 20b and 20c, being parts of one beam.

When the main beam subtends two targets, the conventional monopulse system is incapable of separating the signals, and so a combined signal is used to access the look-up table which quantifies the shape of the main beam, with the result that the two targets may be misidentified as one, and the location of the "single" target will be in error.

In accordance with the present invention a method and system are provided in which a monopulse radar system is able to identify separately the aircraft 10 and the decoy 14, and to identify correctly the separate positions of there two objects.

Figure 2A:
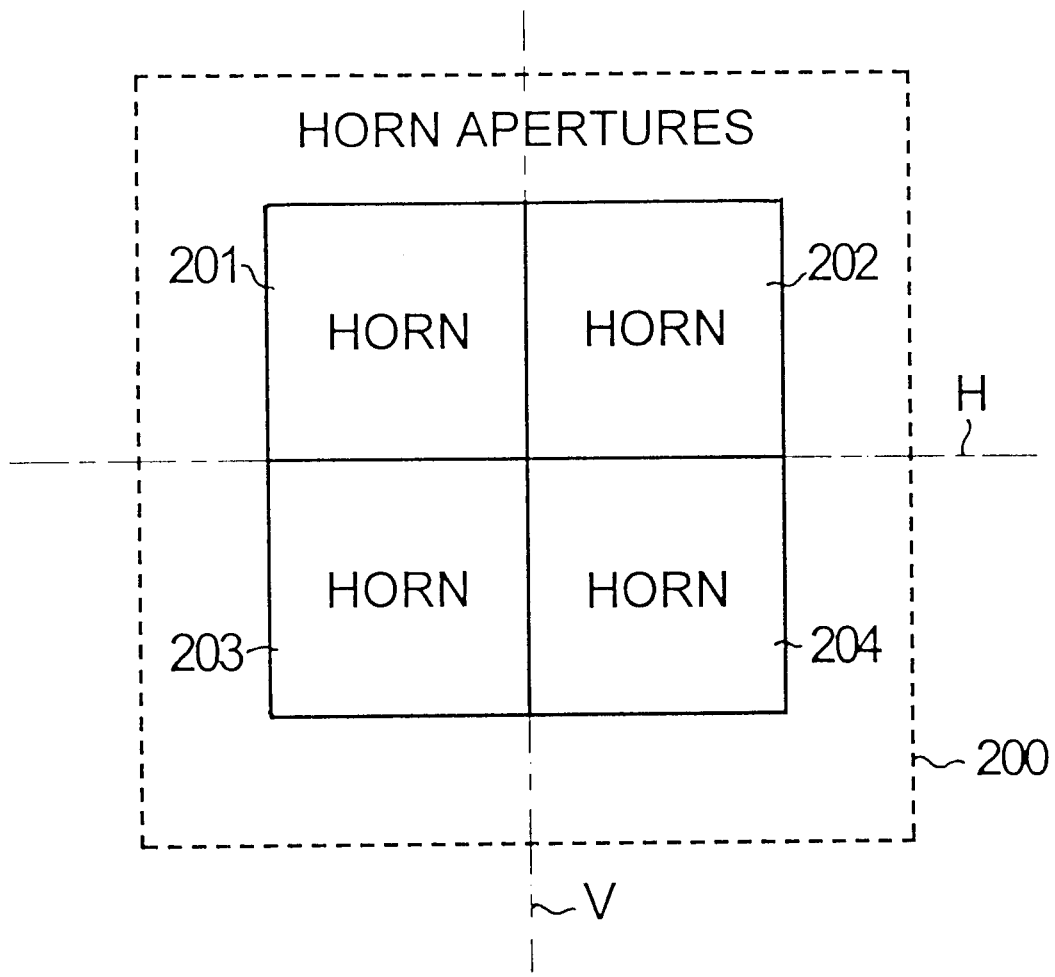
FIG. 2a is a simplified representation of the physical arrangement of an antenna made up of multiple horn antennas.
Figure 2B:
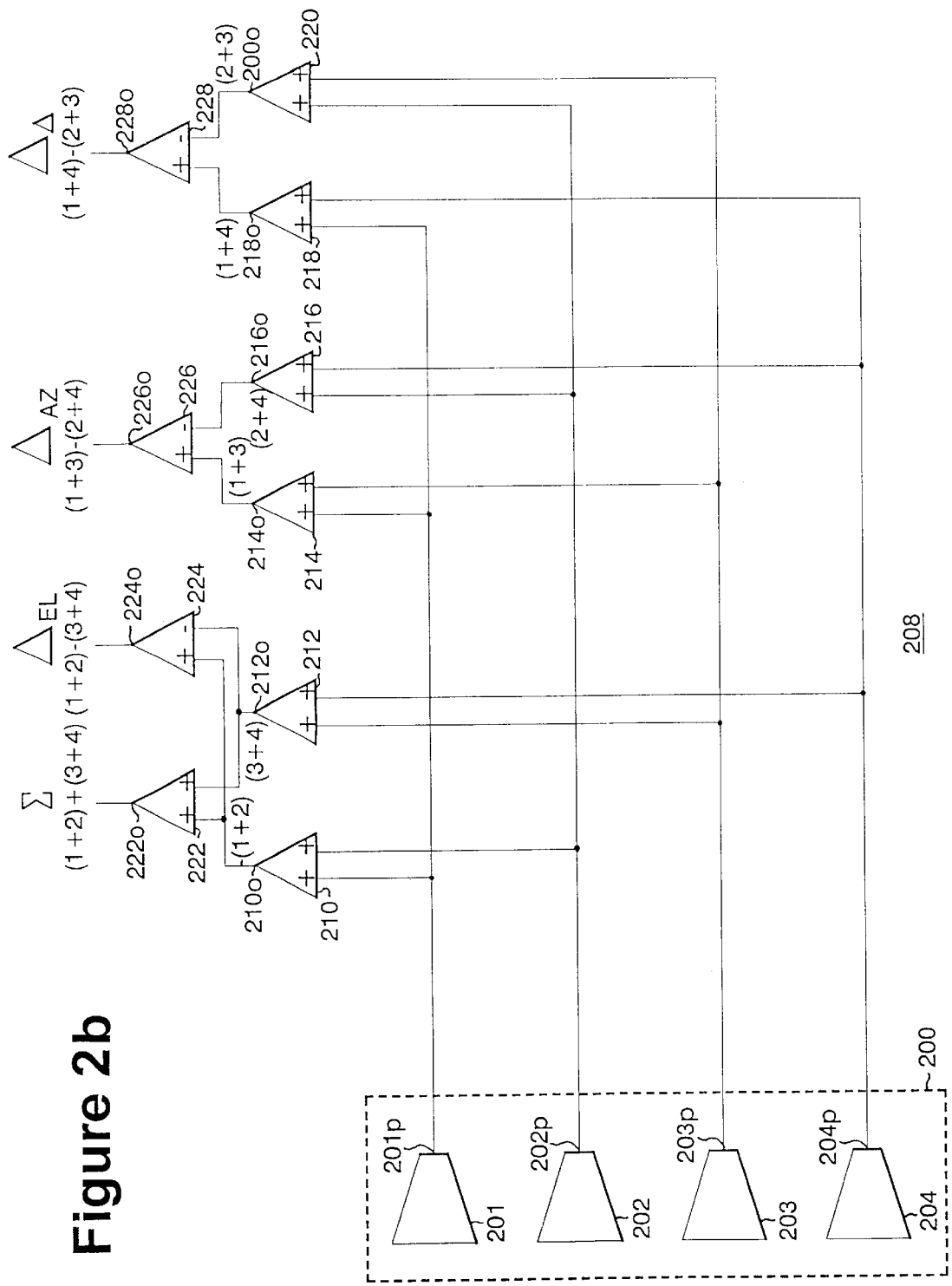
FIG. 2b is a simplified block diagram showing the connections of the horns of FIG. 2a to generate monopulse signals according to an aspect of the invention.

FIG. 2a is a simplified physical representation of a four horn monopulse antenna 200. In FIG. 2a, each of four horn apertures, commonly referred to simply as horns, are designated as 201, 202, 203 and 204. Horn 201 lies over horn 203, and horn 202 lies over horn 204, and, horns 201 and 202 lie above a horizontal plane of separation H. Similarly, horns 201 and 203 lie to the left, and horns 202 and 204 lie to the right, of a vertically oriented plane of separation V. FIG. 2b is a simplified illustration of the connections of horns 201, 202, 203 and 204 of antenna 200 of FIG. 2a for generation of sum and difference beams.

More particularly, as shown in FIG. 2b, an output port 201P of horn 201 is connected to noninverting (+) input ports of summing circuits or adders 210, 214 and 218; and an output port 202P of horn 202 is connected to noninverting input ports of summing circuits 210, 216 and 220. An output port 203P of horn 203 is connected to noninverting input ports of summing circuits 212, 214 and 220; and an output port 204P of horn 204 is connected to noninverting input ports of summing circuits 212, 216 and 218. As a result of these connections, the signal at the output port 210o of summing circuit 210 represents the sum of the signals of horns 201 and 202, or in the notation of FIG. 2b, "(1+2)". Similarly, the output signal at output port 212o of summing circuit 212 represents the sum of the signals of horns 203 and 204, or (3+4), and the output signal at output port 214o of summing circuit 214 represents (1+3). The output signal at output port 216o of summing circuit 216 represents (2+4), the output signal at output port 218o of summing circuit 218 represents (1+4), and the output signal at output port 220o of summing circuit 220 represents (2+3).

In FIG. 2b, a summing circuit 222 has its noninverting input ports coupled to output ports 210o and 212o of summing circuits 210 and 212, respectively, for producing, at its output port 222o, the sum ($\Sigma$) signal representing (1+2)+(3+4). A summing circuit 224 has a noninverting input port coupled to output port 210o of summing circuit 210, and an inverting input port coupled to output port 212o of summing circuit 212, for producing, at its output port 224o, the elevation difference ($\Delta_{EL}$) signal representing (1+2)-(3+4). A summing circuit 226 has a noninverting input port coupled to output port 214o of summing circuit 214, and also has an inverting input port coupled to output port 216o of summing circuit 216, for producing, at its output port 226o, the azimuth difference ($\Delta_{AZ}$) signal representing (1+3)-(2+4). A summing circuit 228 has a noninverting input port coupled to output port 218o of summing circuit 218, and also has an inverting input port coupled to output port 220o of summing circuit 220, for producing, at its output port 228o, the double difference ($\Delta_\Delta$) signal representing (1+4)-(2+3).

It should be understood that the arrangement of FIGS. 2a and 2b represents only one kind of monopulse signal generating antenna. Other types are well known, including the array type, in which the beamformer generates the desired beams directly, and these other types of monopulse antennas may be used in a system according to the invention, so long as they are arranged to produce at least the sum signals, and azimuth, elevation, and double difference signals.

Conventionally, the sum signal, and the azimuth and elevation signals are used to determine the location of a target. In particular, for single target angle estimation, the azimuth and elevation angles can be determined by first forming the azimuth and elevation monopulse ratios using the conventional sum, azimuth difference and elevation difference beams given by the following expressions $$m_A = \frac{\Delta_A}{\Sigma} \quad (1)$$

$$m_E = \frac{\Delta_E}{\Sigma} \quad (2)$$

Figure 3:
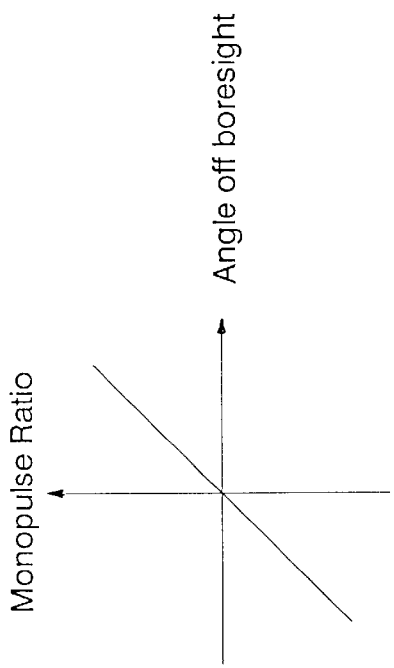
FIG. 3 illustrates how a monopulse ratio can be used to determine a target angle.

The monpulse ratio with respect to angle off boresight can be read off from a look-up table and is illustrated by FIG. 3.

When there are two sources within the radar beam, the monopulse ratios can no longer give angle information of the targets. In order to resolve two sources within the mainbeam, an additional channel is required. The present invention uses the double difference beam described earlier as this additional channel. This channel is typically not used in a conventional radar system. In an advanced radar system, the double-difference beam has been used as the auxiliary beam for mainlobe jamming cancellation application. In accordance with this invention this channel can also be used to generate the following monopulse ratios, for which the azimuth and elevation angle can be determined by the look-up table as before.

$$m_A = \frac{\Delta_\Delta}{\Delta_E} \quad (3)$$

$$m_E = \frac{\Delta_\Delta}{\Delta_A} \quad (4)$$

The monopulse ratios computed by (3) and (4) will be equal to those computed by (1) and (2) provided the antenna array is planar rectangular or in general, the patterns need to satisfy the following generalized separability conditions:

$$\Sigma \Delta_\Delta = \Delta_A \Delta_E \quad (5)$$

This condition is also required for preserving monopulse ratio in adaptive mainlobe cancellation. The monopulse ratios derived from the two ratios can be used as a consistency check for determination of one or more targets. For one target presence, the monopulse ratios using equations (1–4) serve as independent estimate and therefore can thus be averaged to get a better estimate. In the case of two targets within the main antenna beam, the azimuth and elevation monopulse values derived from (1) and (3) and (2) and (4) will not be equal. In fact the azimuth monopulse value (equation (1)) and the elevation monopulse value (using equation (2)) with two sources present have the following expressions:

$$m_A = \frac{\Delta_A}{\Sigma} = \frac{\Delta_{A1} + \Delta_{A2}}{\Sigma_1 + \Sigma_2} \quad (6)$$

$$= m_{A1} \frac{\Sigma_1}{\Sigma_1 + \Sigma_2} + m_{A2} \frac{\Sigma_2}{\Sigma_1 + \Sigma_2}$$

$$m_E = \frac{\Delta_E}{\Sigma} = \frac{\Delta_{E1} + \Delta_{E2}}{\Sigma_1 + \Sigma_2} \quad (7)$$

$$= m_{E1} \frac{\Sigma_1}{\Sigma_1 + \Sigma_2} + m_{E2} \frac{\Sigma_2}{\Sigma_1 + \Sigma_2}$$

Here the monopulse values ($m_{A1}$, $m_{E1)\ and\ (mA2}$, $m_{E2}$) are the monopulse values of the two targets. The monopulse values using difference beam processing (equation (3) and (4)) are given by the following:

$$m_A = \frac{\Delta_\Delta}{\Delta_E} = \frac{\Delta_{\Delta 1} + \Delta_{\Delta 2}}{\Delta_{E1} + \Delta_{E2}} \quad (8)$$

$$= m_{A1} \frac{\Delta_{E1}}{\Delta_{E1} + \Delta_{E2}} + m_{A2} \frac{\Delta_{E2}}{\Delta_{E1} + \Delta_{E2}}$$

-continued $$m_E = \frac{\Delta_\Delta}{\Delta_A} = \frac{\Delta_{\Delta 1} + \Delta_{\Delta 2}}{\Delta_{A1} + \Delta_{A2}} \quad (9)$$

$$= m_{E1} \frac{\Delta_{A1}}{\Delta_{A1} + \Delta_{A2}} + m_{E2} \frac{\Delta_{A2}}{\Delta_{A1} + \Delta_{A2}}$$

These are weighted averages of the corresponding azimuth and elevation monopulse values of the two sources. The weights are the sum and difference pattern values correspondingly. This monopulse value consistency test can be used for determination of one or two sources. If they are the same or close, then there is one source, and the monopulse values can be averaged to give a better estimate. If they are different, then there are more than one target, and we can use the following generalized matrix monopulse ratios:

$$M_A = \begin{bmatrix} \Sigma & \Sigma^* \\ \Delta_E & \Delta_e^* \end{bmatrix}^{-1} \begin{bmatrix} \Delta_A & \Delta_A^* \\ \Delta_\Delta & \Delta_\Delta^* \end{bmatrix} = V^{-1} \begin{bmatrix} m_{A1} & 0 \\ 0 & m_{A2} \end{bmatrix} V \quad (10)$$

where V is the eigenvector matrix. The monopulse ratio matrix has information of the-target angle in the eigenvalues which turn out equal to the monopulse ratio values of the underlying targets. For convenience, let us define the following generalized sum and difference matrices:

$$M_A = \hat{\Sigma}_A^{-1} \hat{\Delta}_A \quad (11)$$

where $$\hat{\Sigma}_A = \begin{bmatrix} \Sigma & \Sigma^* \\ \Delta_E & \Delta_E^* \end{bmatrix} \quad (12)$$

$$\hat{\Delta}_A = \begin{bmatrix} \Delta_A & \Delta_A^* \\ \Delta_\Delta & \Delta_\Delta^* \end{bmatrix}$$

Similarly for the elevation angle estimation, we derive the following matrix monopulse ratio:

$$M_E = \hat{\Sigma}_E^{-1} \hat{\Delta}_E \quad (13)$$

where $$\hat{\Sigma}_E = \begin{bmatrix} \Sigma & \Sigma^* \\ \Delta_A & \Delta_A^* \end{bmatrix} \quad (14)$$

$$\hat{\Delta}_E = \begin{bmatrix} \Delta_E & \Delta_E^* \\ \Delta_\Delta & \Delta_\Delta^* \end{bmatrix}$$

The elevation monopulse ratio matrix has the following eigenvalue decomposition from which the elevation angles can be determined from a look-up table:

$$M_E = V^{-1} \begin{bmatrix} m_{E1} & 0 \\ 0 & m_{E2} \end{bmatrix} V \quad (15)$$

The matrix monopulse ratio processing technique can be summarized as following:

(1) Form the matrix monopulse ratios (equations (11) and (13));
(2) Determine the eigenvalues of the monopulse ratio matrix (equations (10) and (15));
(3) Determine the angles from look-up table (FIG. 3);
(4) Determine the paring of the azimuth and elevation angles based on the similarity of the eigenvectors (equations (10) and (15)).

This algorithm requires two eigenvalue decomposition and azimuth and elevation angle paring. This procedure can further be refined by combining the above azimuth angle and elevation angle matrix processing using the following complex notations:

$$M = \quad (16)$$

$$\sum_A \hat{\Delta}_A + j \sum_E \hat{\Delta}_E = V^{-1} \begin{bmatrix} m_{A1} + j m_{E1} & 0 \\ 0 & m_{A2} + j m_{E2} \end{bmatrix} V$$

Thus only one eigenvalue decomposition is required and the azimuth and elevation angles are automatically paired. The angle estimation algorithm using monopulse ratio consistency test and eigenvalue decomposition of the monpulse ratio matrix is summarized in FIG. 4.

Figure 4:
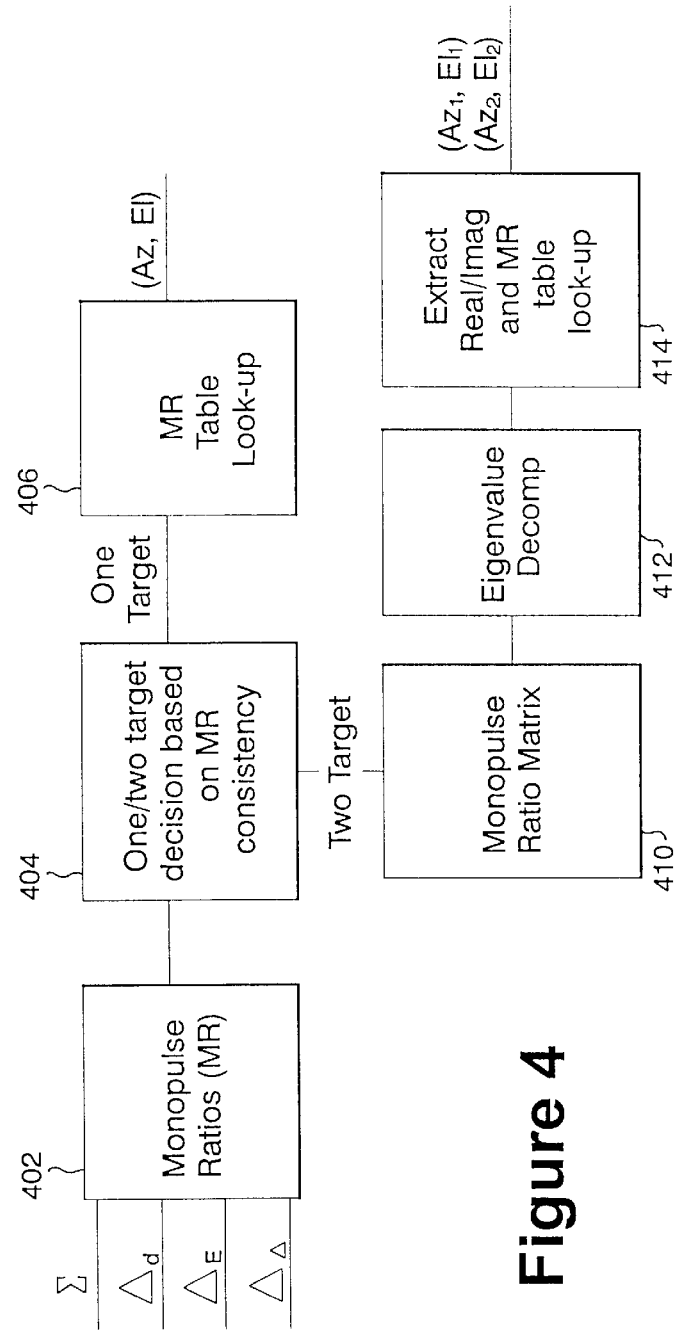
FIG. 4 generally illustrates a matrix monopulse ratio processing technique according to an aspect of this invention.

As represented in FIG. 4, at 402, the $\Sigma$, $\Delta_A$, $\Delta_E$ and $\Delta_\Delta$ values are used to determine the monpulse ratios; and, at 404, these ratios are used to determine whether there is one target or two targets. If one target is present, then at 406, the azimuth and elevation angles of the target are obtained from a look-up table, using the monopulse ratios. If two targets are present, then at 410 the complex monopulse ratio matrix is established, and at 412, an eigenvalue decomposition of the matrix is performed. Then at 414 the azimuth and elevation angles for the targets are obtained from a look-up table using the extracted real and imaginary values of the eigenvalues.

Figure 5:
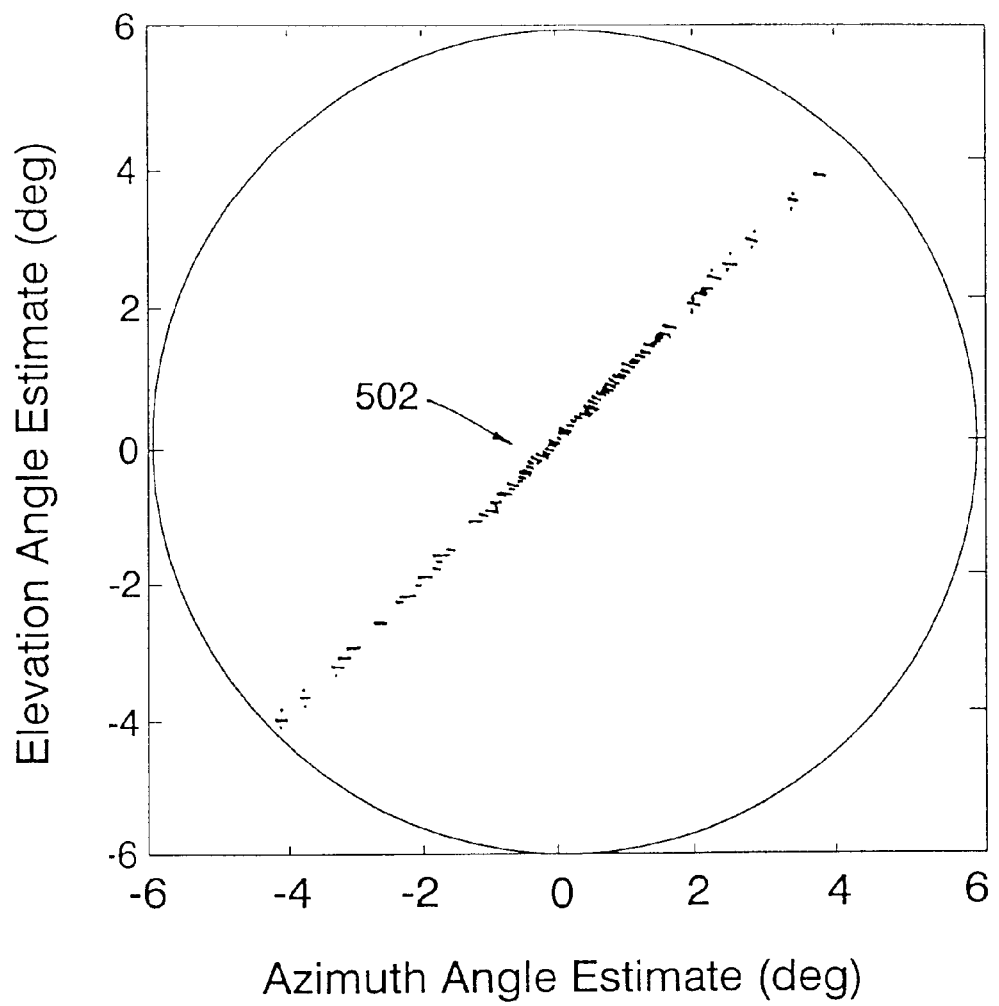
FIG. 5 illustrates a conventional monopulse angle estimation when there are two sources located in a main beam.
Figure 6:
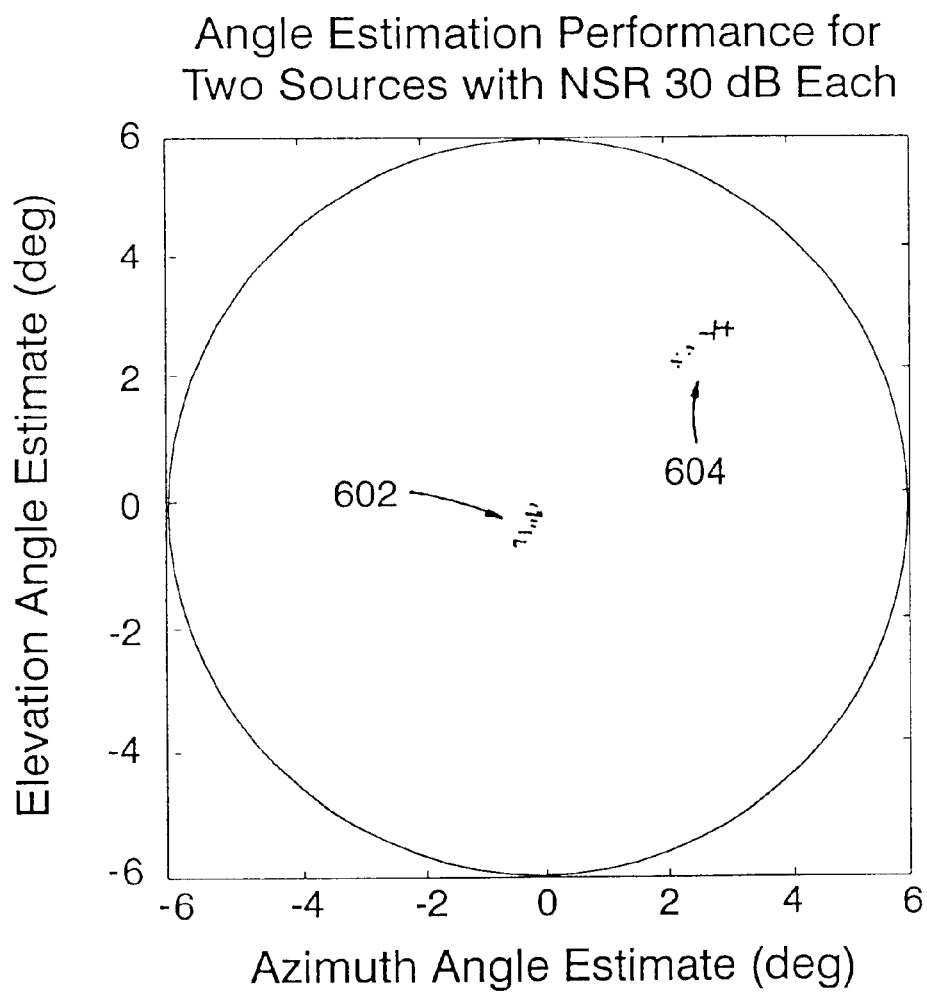
FIG. 6 shows results obtained with the present invention for two target angle estimations.

An example is used to illustrate the super-resolution capability of this technique. The antenna is circular with 9 inch diameter corresponding to beamwidth of 6 degrees. Two sources of azimuth and elevation angles of (0, 0) and (3, 3) are simulated with equal signal-to-noise ratios of 30 dB. Conventional monopulse processing estimates of 200 simulations are carried out and plotted in FIG. 5. The angle estimates are seen to lie along the line 502 connecting the two sources, as suggested by the weighted expressions in equations (6–9). Applying the matrix monopulse ratios shows that there are two distinct sources, and each angle estimate scatters around its true angular location as illustrated at 602 and 604 in FIG. 6.

While it is apparent that the invention herein disclosed is well calculated to fulfill the objects stated above, it will be appreciated that numerous modifications and embodiments may be devised by those skilled in the art, and it is intended that the appended claims cover all such modifications and embodiments as fall within the true spirit and scope of the present invention.

What is claimed is:

1. A method for identifying the locations of plural targets lying within a main beam of a monopulse antenna including at least four ports for generating sum, elevation difference, azimuth difference and double difference signals, the method comprising the steps of:

forming a monopulse ratio matrix from the sum, elevation difference, azimuth difference and double difference signals;

determining eigenvalues of the monopulse ratio matrix; and using the eigenvalues to determine the angular locations of the plural targets.

2. A method according to claim 1, wherein the determining step includes the step of performing an eigenvalue decomposition of the monopulse ratio matrix to generate eigenvalues.

3. A method according to claim 1, wherein:
the forming step includes the steps of
  i) forming a monopulse ratio azimuth matrix, and
  ii) forming a monopulse ratio elevation matrix;
the determining step includes the steps of
  i) determining an eigenvalue decomposition of the monopulse ratio azimuth matrix, and
  ii) determining an eigenvalue decomposition of the monopulse ratio elevation matrix; and
the using step includes the steps of
  i) using the eigenvalues of the monopulse ratio azimuth matrix to determine azimuth angles of the targets, and
  ii) using the eigenvalues of the monopulse ratio elevation matrix to determine elevation angles of the targets.

4. A method according to claim 3, wherein the step of using the eigenvalues include the step of determining a pairing of azimuth and elevation angles of the targets based on the similarity of the eigenvectors of the monopulse ratio azimuth and elevation matrices.

5. A method according to claim 1, wherein the step of using the eigenvalues includes the step of using the eigenvalues to obtain angles of the targets from a look-up table.

6. A system for identifying the locations of plural targets lying within a main beam of a monopulse antenna including four ports for generating sum, elevation difference, azimuth difference and double difference signals, the method comprising the steps of:
  means for forming a monopulse ratio matrix from the sum, elevation difference, azimuth difference and double difference signals;
  means for determining the eigenvalue decomposition of the monopulse ratio matrix; and
  means for using the eigenvectors to determine the angular locations of the plural targets.

7. A system according to claim 6, wherein the determining means includes the means for performing an eigenvalue decomposition of the monopulse ratio matrix to generate eigenvalues.

8. A system according to claim 6, wherein:
the forming means includes
  i) means for forming a monopulse ratio azimuth matrix, and
  ii) means for forming a monopulse ratio elevation matrix;
the determining means includes
  i) means for determining an eigenvalue decomposition of the monopulse ratio azimuth matrix, and
  ii) means for determining an eigenvalue decomposition of the monopulse ratio elevation matrix; and
the using means includes
  i) means for using the eigenvalues of the monopulse ratio azimuth matrix to determine azimuth angles of the targets, and
  ii) means for using the eigenvalues of the monopulse ratio elevation matrix to determine elevation angles of the targets.

9. A system according to claim 8, wherein the using means include the means for determining a pairing of azimuth and elevation angles of the targets based on the similarity of the eigenvectors of the monopulse ratio azimuth and elevation matrices.

10. A system according to claim 6, wherein the using means includes means for using the eigenvalues to obtain angles of the targets from a look-up table.

11. A method for processing information in a main beam of a monopulse antenna including four ports for generating sum, elevation difference, azimuth difference and double difference signals, the method comprising the steps of:
  forming a set of monopulse ratios from the sum, elevation difference, azimuth difference and double difference signals; and
  comparing said ratios to determine whether there is one target or two targets lying within the main beam.

12. A method according to claim 11, further comprising the step of, if there one target lying within the main beam, averaging formed ratios to determine azimuth and elevation angles for said one target.

13. A method according to claim 11, further comprising the step of, if there are two targets lying within the main beam, further processing the sum, elevation difference, azimuth difference, and double difference signal to determine azimuth and elevation angles for each of the targets.

* * * * *